G. MONRATH.
APPARATUS FOR PRODUCING CORROSION RESISTING CONDUITS.
APPLICATION FILED MAY 27, 1916.
1,292,010. Patented Jan. 21, 1919.
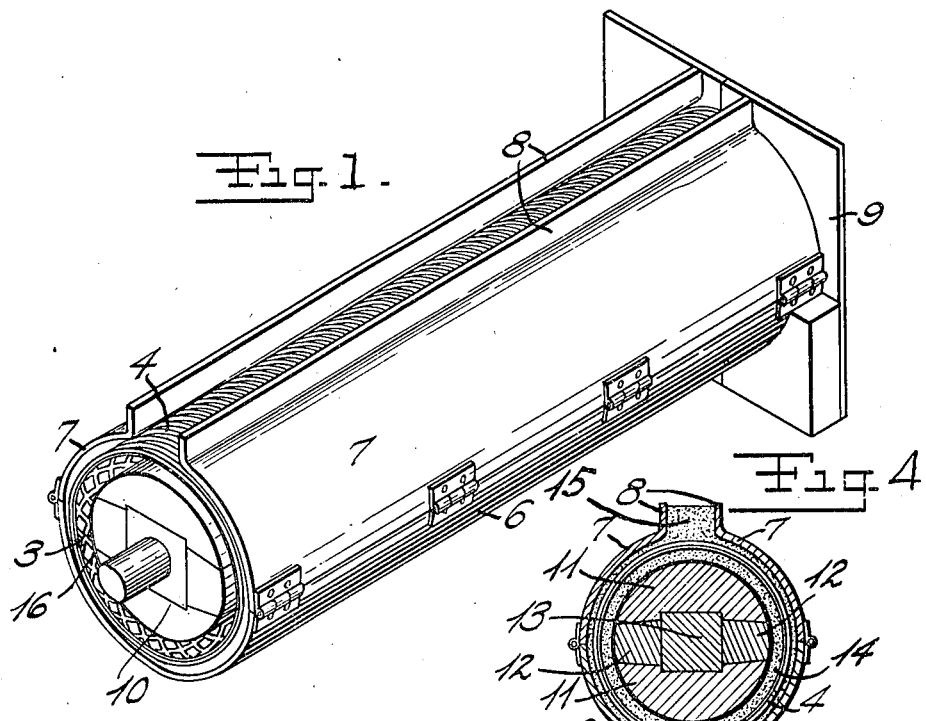
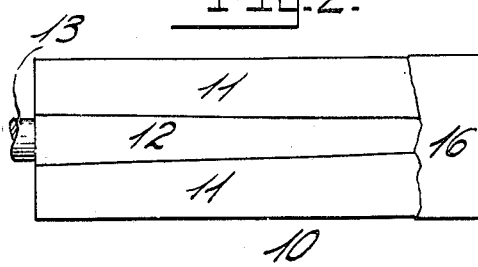
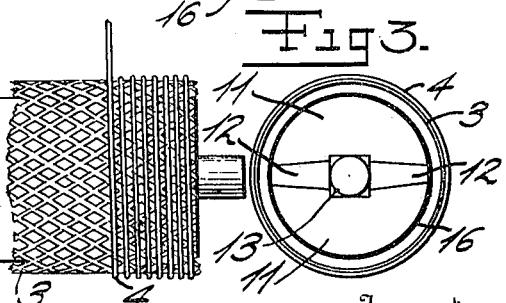

UNITED STATES PATENT OFFICE.

GUSTAV MONRATH, OF CHUQUICAMATA, CHILE, ASSIGNOR TO CHILE EXPLORATION COMPANY, OF NEW YORK, N. Y., A CORPORATION OF NEW JERSEY.

APPARATUS FOR PRODUCING CORROSION-RESISTING CONDUITS.

1,292,010.　　　　　Specification of Letters Patent.　　Patented Jan. 21, 1919.

Application filed May 27, 1916. Serial No. 100,413.

*To all whom it may concern:*

Be it known that I, GUSTAV MONRATH, a citizen of the United States, residing in Chuquicamata, Republic of Chile, South America, have invented certain new and useful Improvements in Apparatus for Producing Corrosion-Resisting Conduits; and I do hereby declare the following to be a full, clear, and exact description of the invention, such as will enable others skilled in the art to which it appertains to make and use the same.

This invention relates to the manufacture of corrosion-resisting pipes or conduits capable of withstanding safely pressures up to, for example, 100 pounds per square inch or more, and capable of conducting without corrosion acids of various strengths and combinations, and particularly to molds for use in such manufacture.

The novel pipe or conduit of the present invention is made of a hard asphaltum mastic composition, reinforced with iron embedded in the mastic in such a way as to give to the pipe or conduit the necessary strength and the capacity of withstanding the desired internal pressure.

The invention will be further described in connection with the embodiments thereof illustrated in the accompanying drawings, in which:

Figure 1 shows in perspective the molding apparatus for producing the pipe or conduit;

Fig. 2 shows the collapsible core;

Fig. 3 is an end view of the core; and

Fig. 4 is a sectional view showing the mold with the pipe cast therein around the core.

In casting the pipe or conduit referred to above, I have found it of advantage to make use of a mold of rolled iron or other appropriate material, the lower half 6 of which is made in one piece and the upper half in two pieces 7 hinged to the lower half. These two upper pieces do not come together but remain spaced apart and have flanges 8 extending upwardly therefrom leaving therebetween an opening of, for example, three to five inches in width depending on the size of the pipe to be cast. This opening serves to facilitate the pouring of the hot material into the mold and enables a ridge to be formed integrally as a part of the conduit.

The mold is provided with end plates 9 of any appropriate construction which will permit the core to be inserted and removed and accurately centered and supported thereby and which will also permit ready removal of the finished conduit.

The core 10 is collapsible and its construction may be varied. I have found that a wooden core can be used to advantage, made in five pieces, as shown, suitably arranged and proportioned so that the parts may be readily assembled and collapsed for purposes of removal. The core illustrated is made up of the upper and lower parts 11, the side pieces 12, and the central part 13, the extensions of which form the support and bearing for the core in the mold.

In preparing to cast the conduit I have found it of advantage to cover the wooden core with paper 16 pasted to the wood in order to prevent the mastic material from sticking to the wood. The heat of the mastic material during the casting operation destroys the pasting and allows the wooden core to be separated readily from the paper which remains attached to the inside of the pipe and can be afterward removed, if desired, by washing or otherwise.

After the core has been prepared, the iron reinforcement in the shape of an open cylinder, is placed over the core and the core is then ready to insert in the mold. In the accompanying drawings the iron reinforcement is illustrated as made up of an expanded metal cylinder 3 suitably fastened together at its uniting edges, and over which is wound a wire 4. In order to make the casting more easily removable the mold is given a coating of a suitable material such as soft soap. The mold is then filled with hot mastic material to a depth varying somewhat with the size of the pipe, for example, to a depth of about four inches in the lower part of the mold. The core with the reinforcing cylinder is then slowly pressed down into the molten mastic. In order that the reinforcement may be properly centered and spaced with respect to the core and the mold so that it will be well embedded within the finished conduit, it may be suitably centered and supported by the end pieces of the mold or from the core by any appropriate supporting or spacing means (not shown).

After the core has been placed in the mold and the reinforcing cylinder suitably arranged therein, the mold is closed and locked, the end pieces holding the core in the exact center. Where part of the mastic has been poured into the bottom of the open mold before insertion of the core and reinforcing cylinder, it will fill the space between the bottom of the core and the bottom of the mold and will extend up part way around the core, depending upon the size of the mold and core and the amount of the mastic thus introduced.

After the mold has been closed, the hot mastic composition is poured in through the slot or opening at the top of the mold until it is flush with the edge of the flanges 8. The pipe or conduit is thus cast in the form of an integral or continuous tube or pipe 14 without joints, and with a ridge or projection 15 on its upper side which serves as a stiffening for the finished pipe or conduit. This ridge may be made of different sizes and wider or narrower, and thinner or thicker, as desired. It may thus be made of considerable width so that it may form a strengthening rib on the bottom of the pipe, and a support for the pipe, in use. In addition to its stiffening function, it also serves to prevent free rotation.

What I claim is:

1. A permanent mold suitable for repeated use in the casting of portable corrosion-resisting conduits of asphaltum mastic composition comprising a lower mold section having a transversely curved inner peripheral surface, upper horizontally disposed mold sections pivoted to the upper edges of the lower mold section and having transversely curved inner peripheral surfaces, said lower and upper mold sections forming in combination a substantially cylindrical mold independent of the conduit cast therein and from which the conduit may be removed by turning the upper mold sections on their pivots and thereby opening the mold, and means for supporting a core within the mold; substantially as described.

2. A permanent mold suitable for use in the casting of portable corrosion-resisting conduits of asphaltum mastic composition comprising a substantially semi-cylindrical lower mold section, an upper mold section pivoted to each upper edge of said lower mold section, said lower and upper mold sections forming in combination a substantially cylindrical mold independent of the conduit cast therein and from which the conduit may be removed by turning the upper mold sections on their pivots and thereby opening the mold, and means for supporting a core within the mold; substantially as described.

3. A permanent mold suitable for repeated use in the casting of portable corrosion-resisting conduits of asphaltum mastic composition comprising a lower mold section curved transversely to form a horizontally disposed trough to receive and sustain the composition, an upper horizontally disposed transversely curved mold section permanently hinged to each upper edge of said lower mold section, said lower and upper mold sections forming in combination a permanent mold of cylindrical configuration from which the cast conduit may be removed by turning the upper mold sections on their hinges, and means for supporting a core within the mold; substantially as described.

In testimony whereof I affix my signature.

GUSTAV MONRATH.